United States Patent
Ojima et al.

(10) Patent No.: US 8,055,225 B2
(45) Date of Patent: Nov. 8, 2011

(54) FM RECEIVER

(75) Inventors: Yoshinari Ojima, Kanagawa (JP); Erina Aochi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 12/465,917

(22) Filed: May 14, 2009

(65) Prior Publication Data

US 2009/0305653 A1    Dec. 10, 2009

(30) Foreign Application Priority Data

Jun. 5, 2008   (JP) .................................. 2008-147918

(51) Int. Cl.
*H04B 1/16* (2006.01)
(52) U.S. Cl. ......... 455/209; 455/205; 455/208; 455/213
(58) Field of Classification Search ............. 455/91–355
See application file for complete search history.

(56) References Cited

U.S. PATENT DOCUMENTS

| | | | | |
|---|---|---|---|---|
| 2002/0155838 A1* | 10/2002 | Durrant et al. | ................ | 455/445 |
| 2007/0281647 A1* | 12/2007 | Corse et al. | .................... | 455/205 |
| 2009/0305653 A1* | 12/2009 | Ojima et al. | .................. | 455/213 |
| 2011/0151814 A1* | 6/2011 | Takeuchi | ...................... | 455/213 |

FOREIGN PATENT DOCUMENTS

| JP | 06-077734 | | 3/1994 |
|---|---|---|---|
| JP | 02009296307 A | * | 12/2009 |

* cited by examiner

*Primary Examiner* — Lincoln Donovan
*Assistant Examiner* — Brandon Cole
(74) *Attorney, Agent, or Firm* — Turocy & Watson, LLP

(57) ABSTRACT

An arctangent detector according to the present invention generates a demodulated signal based on the result of arctangent calculation of the ratio between an in-phase component and a quadrature component obtained from a frequency modulation (FM) received signal that are perpendicular to each other. A median filter substitutes the median value of the sample values obtained by sampling the demodulated signal generated by the arctangent detector as many times as the point number for the current value of the demodulated signal and outputs a resultant signal. The point number altering unit alters the point number in the median filter based on the signal intensity of the FM received signal.

20 Claims, 6 Drawing Sheets

DEMODULATED SIGNAL | WAVEFORM AFTER BEING PASSED THROUGH THREE-POINT MEDIAN FILTER | WAVEFORM AFTER BEING PASSED THROUGH FIVE-POINT MEDIAN FILTER | WAVEFORM AFTER BEING PASSED THROUGH SEVEN-POINT MEDIAN FILTER

FM RECEIVER

CROSS-REFERENCE TO RELATED APPLICATIONS

This application is based upon and claims the benefit of priority from the prior Japanese Patent Application No. 2008-147918, filed on Jun. 5, 2008; the entire contents of which are incorporated herein by reference.

BACKGROUND OF THE INVENTION

1. Field of the Invention

The present invention relates to a frequency modulation (FM) receiver. More particularly, the present invention is preferably applicable to a method by which a pulse noise generated by an arctangent detector can be reduced.

2. Description of the Related Art

Some FM receivers include arctangent detectors to demodulate FM received signals (Japanese Patent Application Laid-open No. H6-77734). An in-phase component and a quadrature component perpendicular to each other obtained from an FM received signal are input to the arctangent detector. The arctangent (arctan) calculation of the ratio between the in-phase component and the quadrature component is performed, and the derivative value of the result of the calculation is output as a demodulated signal.

The arctangent detector generates a pulse noise when a weak electric field signal having a poor S/N ratio is input thereto. Therefore, in a conventional FM receiver, an output from the arctangent detector is passed through a low-pass filter, thereby removing such a pulse noise.

In a method by which a pulse noise is removed by using a low-pass filter, however, a high-frequency signal component that is fundamentally necessary is also removed. Therefore, an audio signal reproduced by an FM receiver may be deteriorated.

BRIEF SUMMARY OF THE INVENTION

A frequency modulation receiver according to an embodiment of the present invention comprises: a first mixer that downconverts an FM received signal; an intermediate frequency amplifier that amplifies the FM received signal downconverted by the first mixer; a second mixer that converts the FM received signal amplified by the intermediate frequency amplifier into an in-phase component and a quadrature component that are perpendicular to each other; an arctangent detector that generates a demodulated signal based on a result of an arctangent calculation of a ratio between the in-phase component and the quadrature component obtained from the FM received signal that are perpendicular to each other; a median filter that substitutes a median value of sample values obtained by sampling the demodulated signal generated by the arctangent detector as many times as point number for a current value of the demodulated signal, and outputs a resultant signal; a signal intensity detecting unit that detects a signal intensity of the FM received signal; and a point number altering unit that alters the point number of the median filter based on the signal intensity of the FM received signal detected by the signal intensity detecting unit.

A frequency modulation receiver according to an embodiment of the present invention comprises: a first mixer that downconverts an FM received signal; an intermediate frequency amplifier that amplifies the FM received signal downconverted by the first mixer; a second mixer that converts the FM received signal amplified by the intermediate frequency amplifier into an in-phase component and a quadrature component that are perpendicular to each other; an arctangent detector that generates a demodulated signal based on a result of an arctangent calculation of a ratio between the in-phase component and the quadrature component obtained from the FM received signal that are perpendicular to each other; a median filter that substitutes a median value of sample values obtained by sampling the demodulated signal generated by the arctangent detector as many times as point number for a current value of the demodulated signal, and outputs a resultant signal; a noise intensity detecting unit that detects a noise intensity of the demodulated signal generated by the arctangent detector based on a difference between an input value and an output value of the median filter; and a point number altering unit that alters the point number of the median filter based on the noise intensity of the demodulated signal detected by the noise intensity detecting unit.

A frequency modulation receiver according to an embodiment of the present invention comprises: a first mixer that downconverts an FM received signal; an intermediate frequency amplifier that amplifies the FM received signal downconverted by the first mixer; a second mixer that converts the FM received signal amplified by the intermediate frequency amplifier into an in-phase component and a quadrature component that are perpendicular to each other; an arctangent detector that generates a demodulated signal based on a result of an arctangent calculation of a ratio between the in-phase component and the quadrature component obtained from the FM received signal that are perpendicular to each other; a median filter that substitutes a median value of sample values obtained by sampling the demodulated signal generated by the arctangent detector as many times as point number for a current value of the demodulated signal, and outputs a resultant signal; a subtractor that detects a noise intensity of the demodulated signal generated by the arctangent detector by calculating a difference between an input value and an output value of the median filter; a determining circuit that determines whether the noise intensity of the demodulated signal detected by the subtractor exceeds a threshold value; and a selector that selects the output value from the median filter as an output signal when the noise intensity of the demodulated signal detected by the subtractor exceeds the threshold value and that selects the input value input to the median filter as an output signal when the noise intensity of the demodulated signal detected by the subtractor does not exceed the threshold value.

DETAILED DESCRIPTION OF THE INVENTION

Exemplary embodiments of an FM receiver according to the present invention are described below in detail with reference to accompanying drawings. However, the present invention is not to be considered limited to the embodiments.

First Embodiment

Figure 1:
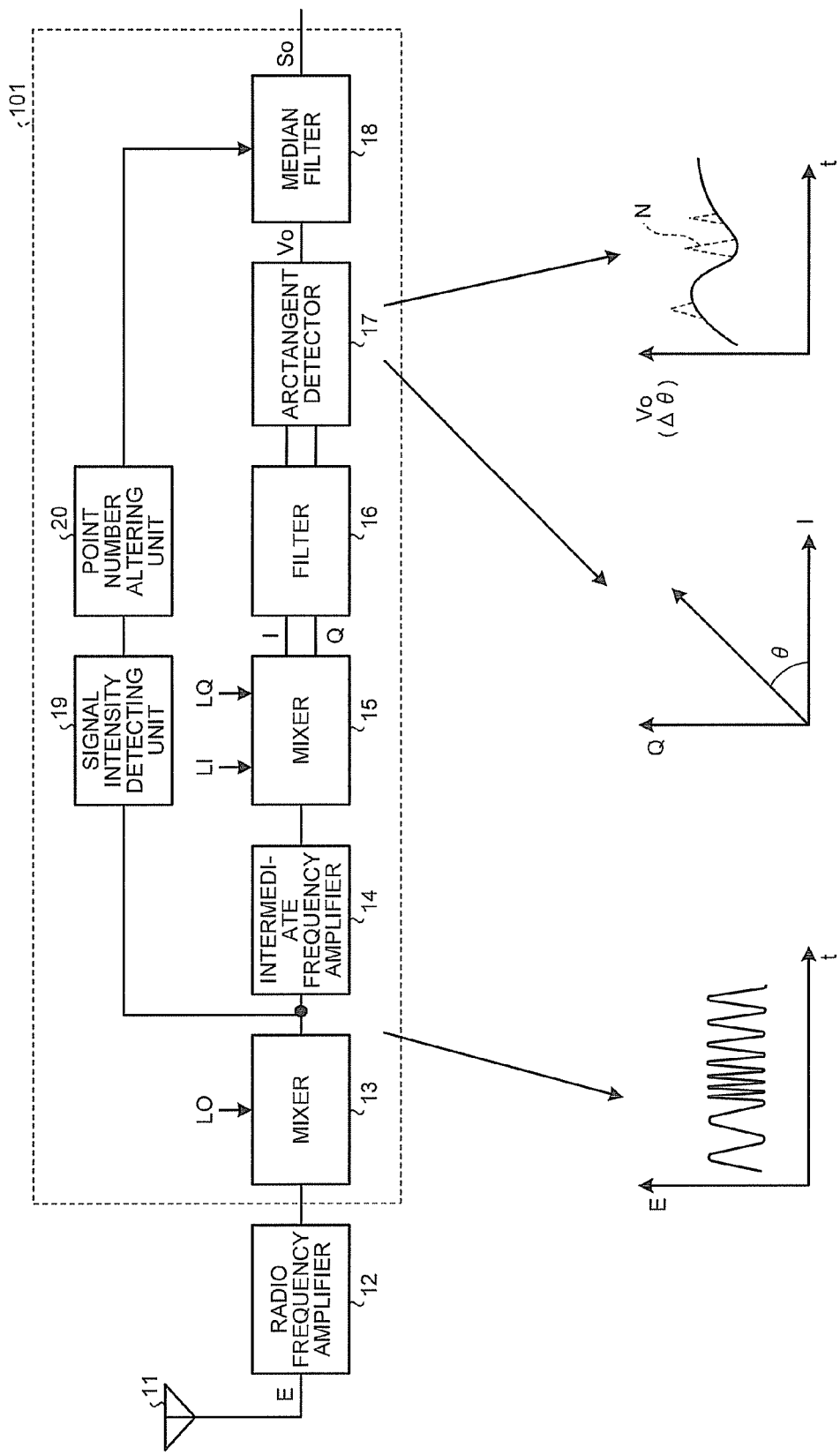
FIG. 1 is a block diagram of an FM receiver according to a first embodiment of the present invention.

FIG. 1 is a block diagram of an FM receiver according to a first embodiment of the present invention.

In FIG. 1, the FM receiver includes a receiving antenna 11 that receives a radio wave transmitted in space, a radio frequency amplifier 12 that amplifies an FM received signal E received by the receiving antenna 11, a mixer 13 that multiplies the FM received signal E amplified by the radio frequency amplifier 12 by a local oscillate signal LO, thereby downconverting the FM received signal E, an intermediate frequency amplifier 14 that amplifies the FM received signal E downconverted by the mixer 13, a mixer 15 that multiplies the FM received signal E amplified by the intermediate frequency amplifier 14 by local oscillate signals LI and LQ that are perpendicular to each other, thereby converting the FM received signal E into an in-phase component I and a quadrature component Q, and a filter 16 that removes an unnecessary high-frequency component from the output from the mixer 15.

The FM receiver further includes an arctangent detector 17 that calculates the arctangent value $\theta = \tan^{-1}(Q/I)$ and outputs, as a demodulated signal Vo, the derivative value $\Delta\theta = d\theta/dt$ of the arctangent value $\theta$ where the arctangent value $\theta$ is the ratio between the in-phase component I and the quadrature component Q that pass through the filter 16, a median filter 18 that substitutes the median value of the sampling values obtained by sampling the demodulated signal Vo output from the arctangent detector 17 as many times as the point number for a current value of the demodulated signal Vo and outputs a resultant signal, a signal intensity detecting unit 19 that detects a signal intensity of the FM received signal based on the output from the mixer 13, and a point number altering unit 20 that alters the point value in the median filter 18 based on the signal intensity of the FM received signal E detected by the signal intensity detecting unit 19.

The mixers 13 and 15, the intermediate frequency amplifier 14, the filter 16, the arctangent detector 17, the median filter 18, the signal intensity detecting unit 19, and the point number altering unit 20 may be formed on an IC chip 101. The radio frequency amplifier 12 may be modularized separately of the IC chip 101.

The receiving antenna 11 receives the FM modulated signal transmitted by an FM transmitter, and the radio frequency amplifier 12 amplifies the FM received signal E. Then, the amplified FM received signal E is sent to the mixer 13. In the mixer 13, the FM received signal E sent from the radio frequency amplifier 12 is multiplied by the local oscillate signal LO, thereby the FM received signal E is downconverted. Then, the intermediate frequency amplifier 14 amplifies the FM received signal E and sends the amplified FM received signal E to the mixer 15. In the mixer 15, the FM received signal E sent from the intermediate frequency amplifier 14 is multiplied by the local oscillate signals LI and LQ, thereby the FM received signal E is converted into the in-phase component I and the quadrature component Q, and an unnecessary high-frequency component is removed by the filter 16. Then, the in-phase component I and the quadrature component Q are sent to the arctangent detector 17. In the arctangent detector 17, the arctangent value $\theta$ of the ratio between the in-phase component I and the quadrature component Q that passed through the filter 16 is calculated, and then, the derivative value $\Delta\theta$ of the arctangent value $\theta$ is output to the median filter 18 as the demodulated signal Vo.

The FM received signal E output from the mixer 13 is sent to the signal intensity detecting unit 19. In the signal intensity detecting unit 19, the signal intensity of the FM received signal E is detected, and is output to the point number altering unit 20. The point number altering unit 20 alters the point number PN in the median filter 18 based on the signal intensity of the FM received signal E detected by the signal intensity detecting unit 19.

For example, if threshold values $E_1$, $E_2$, and $E_3$ of the FM received signal E are set to be $E_1 > E_2 > E_3$, the point number PN in the median filter 18 may be altered as follows:

$E > E_1$ :PN=3;
$E_1 \geq E > E_2$ :PN=5;
$E_2 \geq E > E_3$ :PN=7; and
$E_3 \geq E$ :PN=9.

The median filter 18 samples the demodulated signal Vo as many times as the point number altered by the point number altering unit 20, and substitutes the median value of the sample values obtained by sampling the demodulated signal Vo as many times as the point number for a current value of the demodulated signal Vo, thereby removing a pulse noise N that is superimposed on the demodulated signal Vo, and outputs the demodulated signal Vo removed the pulse noise N therefrom as an output signal So.

Figure 2:
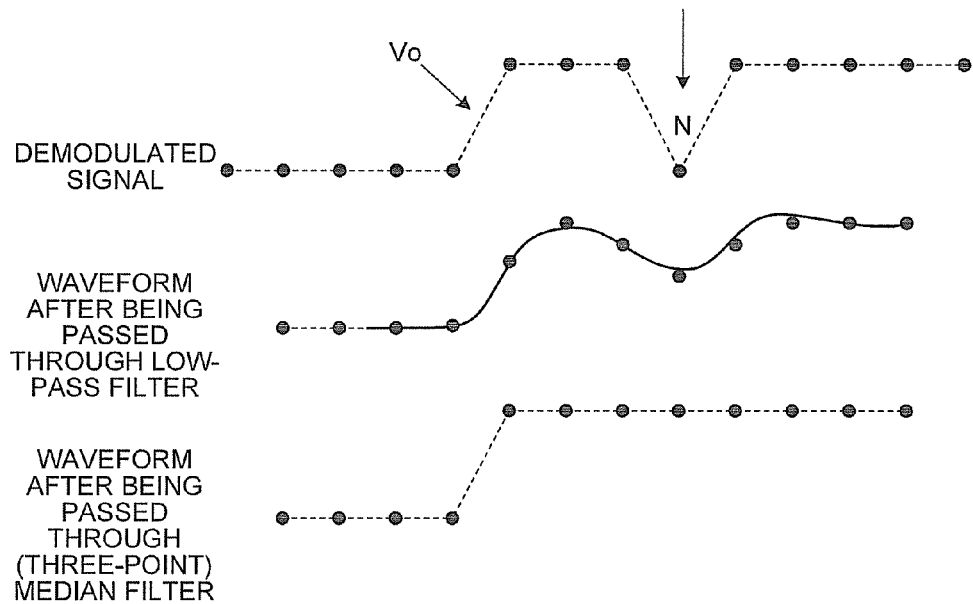
FIG. 2 depicts a comparison between a waveform after an output from an arctangent detector is passed through a low-pass filter and a waveform after the output from the arctangent detector is passed through a median filter.

FIG. 2 depicts a comparison between a waveform after the output from the arctangent detector is passed through the low-pass filter and a waveform after the output from the arctangent detector is passed through the median filter.

In FIG. 2, when the demodulated signal Vo on which a pulse noise N is superimposed is passed through the low-pass filter, a high-frequency signal component that is fundamentally necessary is also removed and the waveform of the demodulated signal Vo becomes blunt. Therefore, an audio signal reproduced by the FM receiver may be deteriorated.

On the other hand, when the three-point median filter 18 is used in place of the low-pass filter, the three points of sample values sampled from the demodulated signal Vo can be lined up based on intensity thereof so that the smallest sample value comes first, and the sample value in the middle among the sample values can be substituted for the current value of the demodulated signal Vo. Thus, while maintaining the original waveform of the demodulated signal Vo, the pulse noise N can be removed therefrom.

In a setting method for the point number in the median filter 18, when the intensity of the FM received signal E is high, the point number in the median filter 18 may preferably be decreased, and when the intensity of the FM received signal E is low, the point number in the median filter 18 may preferably be increased.

When the intensity of the FM received signal E is high, the arctangent detector 17 generates less pulse noise N. Therefore, even if the point number in the median filter 18 is decreased, the influence of the noise N on the audio signal can be reduced, and thus, the signal component loss of the FM received signal E can be reduced.

On the other hand, when the intensity of the FM received signal is low, the arctangent detector 17 generates more pulse noise N. Therefore, by increasing the point number in the median filter 18, the noise N that is superimposed on the demodulated signal Vo can be effectively removed, and thus, the influence of the noise N on the audio signal can be reduced.

Figure 3:
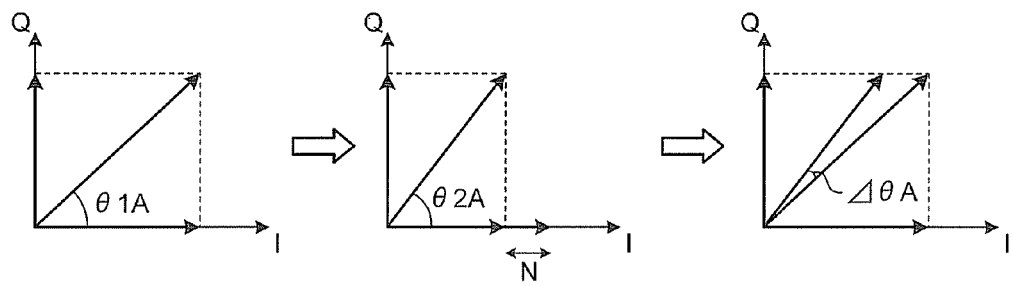
FIG. 3 depicts an intensity of a pulse noise generated by an arctangent detector when a strong electric field signal is input to the arctangent detector.

FIG. 3 depicts an intensity of the pulse noise generated by the arctangent detector when a strong electric field signal is input to the arctangent detector.

In FIG. 3, when the intensity of the FM received signal E is high, the arctangent value of the ratio between the in-phase component I and the quadrature component Q before the noise N is superimposed thereon is referred to as θ1A, and the arctangent value of the ratio between the in-phase component I and the quadrature component Q after the noise N is superimposed thereon is referred to as θ2A. Here, the difference between the arctangent values θ1A and θ2A is small. Therefore, noise of the demodulated signal Vo is also small.

Figure 4:
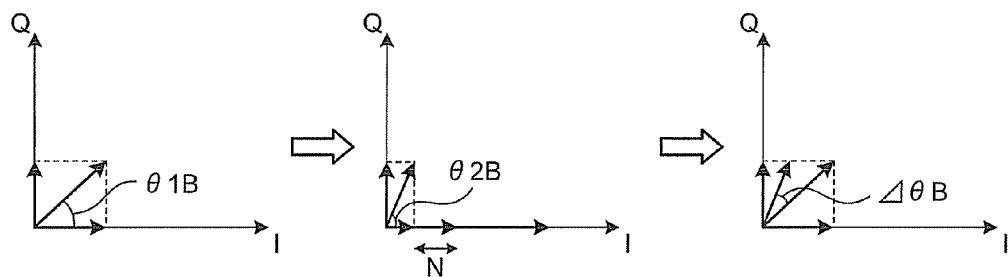
FIG. 4 depicts an intensity of a pulse noise generated by the arctangent detector when a weak electric field signal is input to the arctangent detector.

FIG. 4 depicts an intensity of the pulse noise generated by the arctangent detector when a weak electric field signal is input to the arctangent detector.

In FIG. 4, when the intensity of the FM received signal E is low, the arctangent value of the ratio between the in-phase component I and the quadrature component Q before the noise N is superimposed thereon is referred to as θ1B, and the arctangent value of the ratio between the in-phase component I and the quadrature component Q after the noise N is superimposed thereon is referred to as θ2B. Here, the difference between the arctangent values θ1B and θ2B is large. Therefore, the noise of the demodulated signal Vo is also large.

Figure 5:
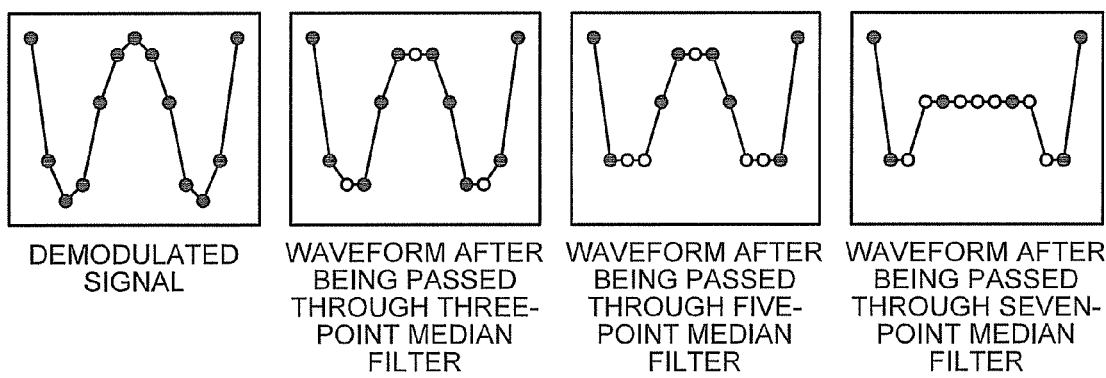
FIG. 5 is a diagram of exemplary waveforms of a demodulated signal after being passed through a median filter while the point number in a median process is altered.

FIG. 5 is a diagram of exemplary waveforms of a demodulated signal Vo after being passed through the median filter while the point number in the median filter is altered.

In FIG. 5, when the point number in the median filter 18 is small, the waveform of the demodulated signal Vo remains generally the same even after being passed through the median filter 18. As the point number in the median filter 18 increases, however, the difference between the original waveform of the demodulated signal Vo and the waveform thereof after being passed through the median filter 18 becomes larger.

On the other hand, when the point number in the median filter 18 is small, an isolated pulse noise N can be removed but sequent pulse noises N can not be removed.

Therefore, the intensity of the noise N may be observed, and thus, considering also the intensity of the noise N, the point number in the median filter 18 may be altered based not only on the intensity of the FM received signal E but also on the intensity of the noise N.

Alternatively, the point number in the median filter 18 may be altered based on the type of the signal source. The types of the signal source may be, for example, music, conversation, and speech.

Figure 6:
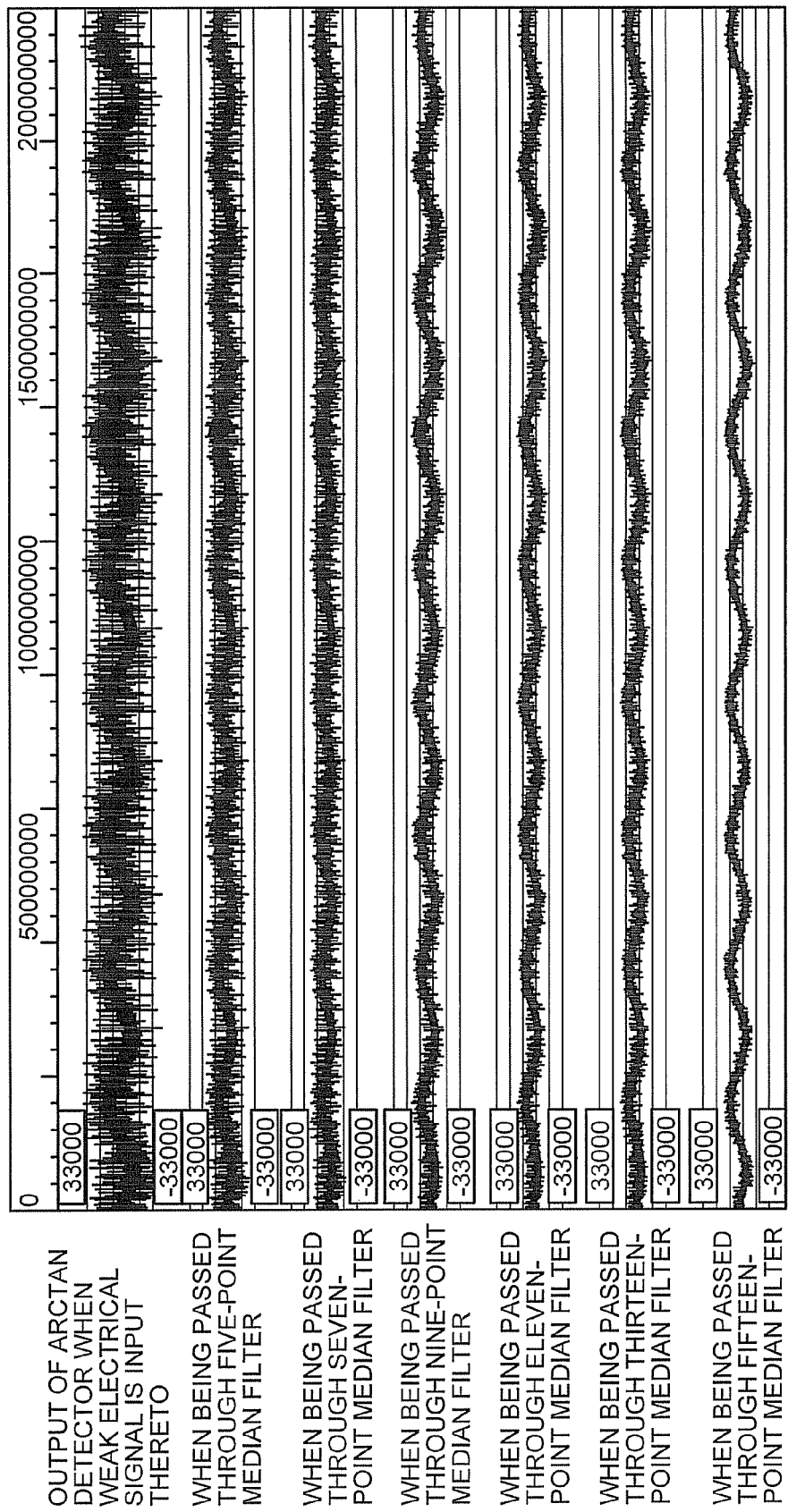
FIG. 6 depicts a comparison between a waveform of an output from an arctangent detector when a weak electric field signal is input thereto and waveforms of a demodulated signal after being passed through a median filter while the point number in a median process is altered.

FIG. 6 depicts a comparison between a waveform of an output from the arctangent detector when a weak electric field signal is input thereto and waveforms of a demodulated signal Vo after being passed through the median filter while the point number in the median process is altered.

In FIG. 6, when the point number in the median filter 18 is small, the noise N that can not be removed remains. On the other hand, as the point number in the median filter 18 increases, the noise N can be removed almost completely.

By using the median filter 18, the noise N can be removed while maintaining a high-frequency component of the signal. Thus, a clear reproduced sound can be obtained.

On the other hand, if the low-pass filter is used in place of the median filer 18, the noise N can be removed. A high-frequency component of the signal, however, is also removed. Therefore, a reproduced sound sounds muffled.

Second Embodiment

Figure 7:
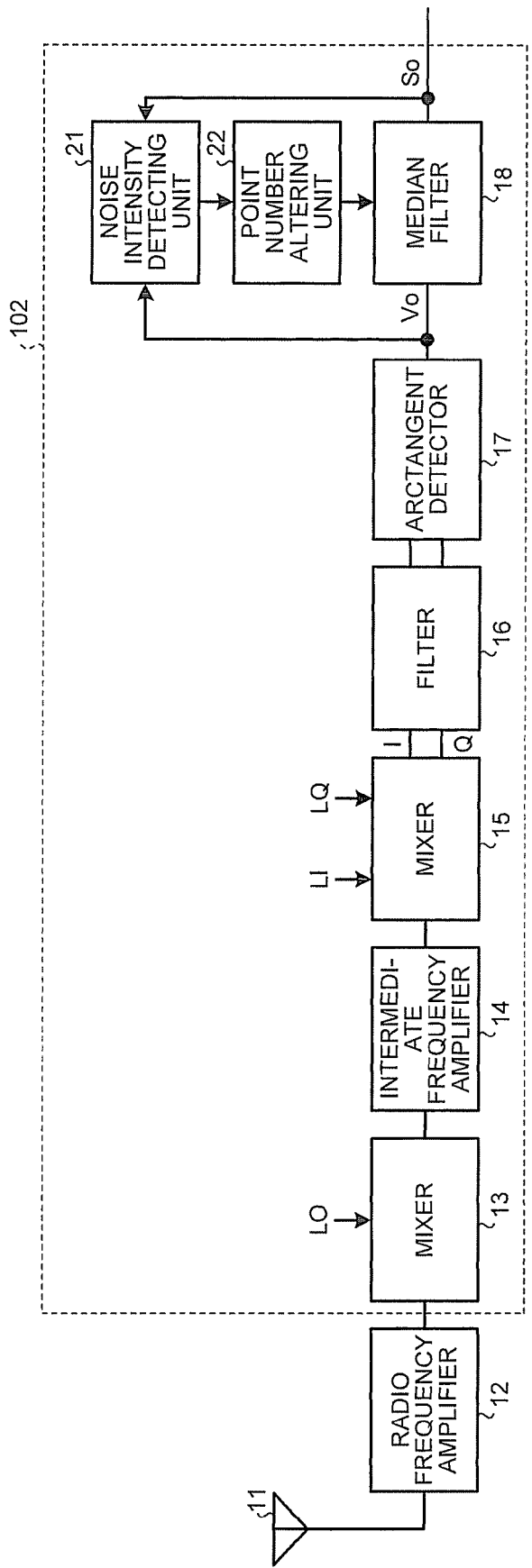
FIG. 7 is a block diagram of an FM receiver according to a second embodiment of the present invention.

FIG. 7 is a block diagram of an FM receiver according to a second embodiment of the present invention.

In FIG. 7, the FM receiver includes a noise intensity detecting unit 21 and a point number altering unit 22 in place of the signal intensity detecting unit 19 and the point number altering unit 20 shown in FIG. 1.

The mixers 13 and 15, the intermediate frequency amplifier 14, the filter 16, the arctangent detector 17, the median filter 18, the noise intensity detecting unit 21, and the point number altering unit 22 may be formed on an IC chip 102. The radio frequency amplifier 12 may be modularized separately of the IC chip 102.

The noise intensity detecting unit 21 can detect the intensity of the noise N of the demodulated signal Vo output from the arctangent detector 17 based on the difference between the input value and the output value of the median filter 18. The point number altering unit 22 can alter the point number in the median filter 18 based on the intensity of the noise N of the demodulated signal Vo detected by the noise intensity detecting unit 21.

The peak intensity of the noise N for the unit time may be used as the noise intensity detected by the noise intensity detecting unit 21. Alternatively, the average value of the intensity of the noise N for the unit time may be used thereas.

In the arctangent detector 17, the arctangent value θ of the ratio between the in-phase component I and the quadrature component Q is calculated, and then, the derivative value Δθ of the arctangent value θ is output to the median filter 18 and to the noise intensity detecting unit 21 as the demodulated signal Vo. The median filter 18 removes the noise N that is superimposed on the demodulated signal Vo, and the resultant signal is output to the noise intensity detecting unit 21 as the output signal So.

In the noise intensity detecting unit 21, the intensity of the noise N of the demodulated signal Vo is detected based on the difference between the output signal So and the demodulated signal Vo, and the intensity thereof is output to the point number altering unit 22. The point number altering unit 22 alters the point number in the median filter 18 based on the intensity of the noise N of the demodulated signal Vo detected by the noise intensity detecting unit 21.

In a setting method for the point number in the median filter 18, when the intensity of the noise N of the demodulated signal Vo is low, the point number in the median filter 18 is preferably decreased, and when the intensity of the noise N of the demodulated signal Vo is high, the point number in the median filter 18 is preferably increased.

When the intensity of the noise N of the demodulated signal Vo is low, even if the point number in the median filter 18 is decreased, the influence of the noise N on the audio signal can be reduced, and thus, the signal component loss of the FM received signal E can be reduced. If the intensity of the noise N of the demodulated signal Vo is lower than a predetermined value, the point number in the median filter 18 may be set to be 0 so that the effect achieved by the process performed by the median filter is nullified.

On the other hand, when the intensity of the noise N of the demodulated signal Vo is high, by increasing the point number in the median filter 18, the pulse noise N that is superimposed on the demodulated signal Vo can be effectively removed, and thus, the influence of the noise N on the audio signal can be reduced.

Third Embodiment

Figure 8:
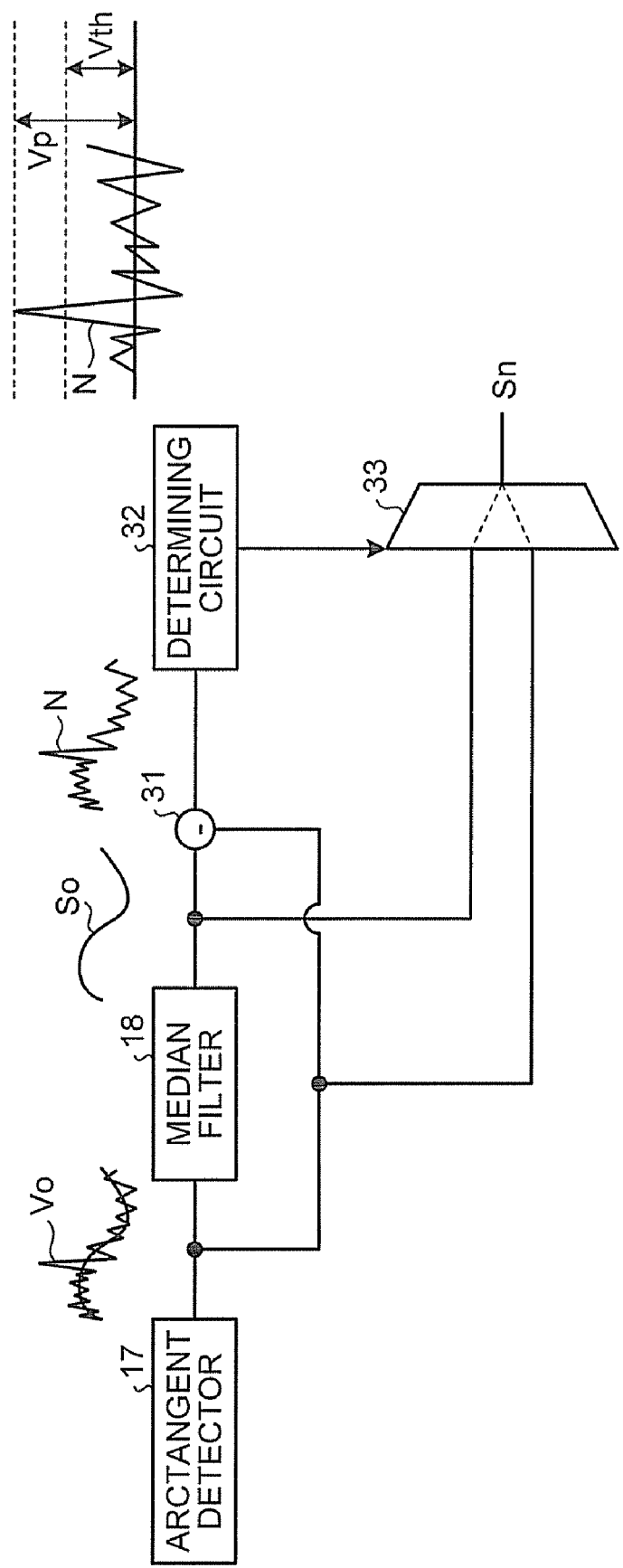
FIG. 8 is a block diagram of an FM demodulator that is applied to an FM receiver according to a third embodiment of the present invention.

FIG. 8 is a block diagram of an FM demodulator that is applied to an FM receiver according to a third embodiment of the present invention.

In FIG. 8, the FM demodulator includes the arctangent detector 17, the median filter 18, a subtractor 31, a determining circuit 32, and a selector 33. The arctangent detector 17 and the median filter 18 each have the identical configuration as that shown in FIG. 1. The subtractor 31 can detect an intensity Vp of the noise N of the demodulated signal Vo generated by the arctangent detector 17 by calculating the difference between the input value and the output value of the median filter 18.

The determining circuit 32 can determine whether the intensity Vp of the noise N of the demodulated signal Vo detected by the subtractor 31 exceeds a threshold value Vth. The intensity Vp of the noise N that is compared with the threshold value Vth by the determining circuit 32 may be the peak intensity of the noise N for the unit time, or may be the average value of the intensity of the noise N for the unit time.

The selector 33 can select either the demodulated signal Vo output from the arctangent detector 17 or the output signal So output from the median filter 18 based on the result of determination performed by the determining circuit 32, and can output the selected signal to external resources as an output signal Sn.

The receiving antenna 11, the radio frequency amplifier 12, the mixers 13 and 15, the intermediate frequency amplifier 14, and the filter 16 shown in FIG. 1 may be provided before the arctangent detector 17. The mixers 13 and 15, the intermediate frequency amplifier 14, the filter 16, the arctangent detector 17, the median filter 18, the subtractor 31, the determining circuit 32, and the selector 33 may be formed on a single IC chip.

In the arctangent detector 17, the arctangent value θ of the ratio between the in-phase component I and the quadrature component Q is calculated, and then, the derivative value Δθ of the arctangent value θ is output to the median filter 18 and the subtractor 31 as the demodulated signal Vo. The median filter 18 removes the noise N that is superimposed on the demodulated signal Vo, and the resultant signal is output to the subtractor 31 as the output signal So.

In the subtractor 31, the intensity of the noise N of the demodulated signal Vo is detected based on the difference between the output signal So and the demodulated signal Vo, and the intensity of the noise N is output to the determining circuit 32. The determining circuit 32 compares the intensity Vp of the noise N of the demodulated signal Vo with the threshold value Vth, and thus, determines whether the intensity Vp of the noise N of the demodulated signal Vo exceeds the threshold value Vth. Then, the determining circuit 32 outputs the result of the determination to the selector 33.

If the intensity Vp of the noise N of the demodulated signal Vo is determined to exceed the threshold value Vth, the selector 33 selects the output signal So from the median filter 18 as the external output signal Sn. If the intensity Vp of the noise N of the demodulated signal Vo is determined not to exceed the threshold value Vth, the selector 33 selects the demodulated signal Vo from the arctangent detector 17 as the external output signal Sn.

By determining whether the intensity Vp of the noise N of the demodulated signal Vo exceeds the threshold value Vth, the noise itself of the demodulated signal Vo can be detected even if the original signal component of the noise is removed in the median filter 18. Thus, an unnecessary median process due to the characteristics of the median filter 18 can be prevented from being provided to the demodulated signal Vo. Therefore, the signal component loss of the FM received signal E can be reduced and the noise N that is superimposed on the demodulated signal Vo can be effectively removed.

In the third embodiment shown in FIG. 8, a method is described by which the selector 33 selects either the demodulated signal Vo output from the arctangent detector 17 or the output signal So output from the median filter 18 based on whether the intensity Vp of the noise N of the demodulated signal Vo exceeds the threshold value Vth. The point number in the median filter 18 may also be altered based on whether the intensity Vp of the noise N of the demodulated signal Vo exceeds the threshold value Vth. More specifically, if the intensity Vp of the noise N of the demodulated signal Vo detected by the substractor 31 is determined to exceed the threshold value Vth, the point number in the median filter 18 may be increased, and if the intensity Vp of the noise N of the demodulated signal Vo determined by the subtractor 31 is determined not to exceed the threshold value Vth, the point number in the median filter may be decreased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A frequency modulation (FM) receiver comprising:
   a first mixer that downconverts an FM received signal;
   an intermediate frequency amplifier that amplifies the FM received signal downconverted by the first mixer;
   a second mixer that converts the FM received signal amplified by the intermediate frequency amplifier into an in-phase component and a quadrature component that are perpendicular to each other;
   an arctangent detector that generates a demodulated signal based on a result of an arctangent calculation of a ratio between the in-phase component and the quadrature component obtained from the FM received signal that are perpendicular to each other;
   a median filter that substitutes a median value of sample values obtained by sampling the demodulated signal generated by the arctangent detector as many times as point number for a current value of the demodulated signal, and outputs a resultant signal;
   a signal intensity detecting unit that detects a signal intensity of the FM received signal; and
   a point number altering unit that alters the point number of the median filter based on the signal intensity of the FM received signal detected by the signal intensity detecting unit.

2. The FM receiver according to claim 1, further comprising a filter that removes an unnecessary high-frequency component from an output of the second mixer.

3. The FM receiver according to claim 2, wherein the first mixer, the intermediate frequency amplifier, the second mixer, the filter, the arctangent detector, the median filter, the signal intensity detecting unit, and the point number altering unit are formed on a single integrated circuit (IC) chip.

4. The FM receiver according to claim 3, further comprising:
a receiving antenna that receives a radio wave transmitted in space; and
a radio frequency amplifier that amplifies the FM received signal received by the receiving antenna.

5. The FM receiver according to claim 4, wherein the radio frequency amplifier is modularized separately of the IC chip.

6. The FM receiver according to claim 1, wherein the point number altering unit decreases the point number in the median filter when the intensity of the FM received signal is high, and increases the point number in the median filter when the intensity of the FM received signal is low.

7. A frequency modulation (FM) receiver comprising:
a first mixer that downconverts an FM received signal;
an intermediate frequency amplifier that amplifies the FM received signal downconverted by the first mixer;
a second mixer that converts the FM received signal amplified by the intermediate frequency amplifier into an in-phase component and a quadrature component that are perpendicular to each other;
an arctangent detector that generates a demodulated signal based on a result of an arctangent calculation of a ratio between the in-phase component and the quadrature component obtained from the FM received signal that are perpendicular to each other;
a median filter that substitutes a median value of sample values obtained by sampling the demodulated signal generated by the arctangent detector as many times as point number for a current value of the demodulated signal, and outputs a resultant signal;
a noise intensity detecting unit that detects a noise intensity of the demodulated signal generated by the arctangent detector based on a difference between an input value and an output value of the median filter; and
a point number altering unit that alters the point number of the median filter based on the noise intensity of the demodulated signal detected by the noise intensity detecting unit.

8. The FM receiver according to claim 7, further comprising a filter that removes an unnecessary high-frequency component from an output of the second mixer.

9. The FM receiver according to claim 8, wherein the first mixer, the intermediate frequency amplifier, the second mixer, the filter, the arctangent detector, the median filter, the noise intensity detecting unit, and the point number altering unit are formed on a single integrated circuit (IC) chip.

10. The FM receiver according to claim 9, further comprising:
a receiving antenna that receives a radio wave transmitted in space; and
a radio frequency amplifier that amplifies the FM received signal received by the receiving antenna.

11. The FM receiver according to claim 10, wherein the radio frequency amplifier is modularized separately of the IC chip.

12. The FM receiver according to claim 7, wherein the point number altering unit decreases the point number in the median filter when the noise intensity is low, and increases the point number in the median filter when the noise intensity is high.

13. The FM receiver according to claim 7, wherein the noise intensity is a peak intensity of noise for a unit time.

14. The FM receiver according to claim 7, wherein the noise intensity is an average value of an intensity of noise for a unit time.

15. A frequency modulation (FM) receiver comprising:
a first mixer that downconverts an FM received signal;
an intermediate frequency amplifier that amplifies the FM received signal downconverted by the first mixer;
a second mixer that converts the FM received signal amplified by the intermediate frequency amplifier into an in-phase component and a quadrature component that are perpendicular to each other;
an arctangent detector that generates a demodulated signal based on a result of an arctangent calculation of a ratio between the in-phase component and the quadrature component obtained from the FM received signal that are perpendicular to each other;
a median filter that substitutes a median value of sample values obtained by sampling the demodulated signal generated by the arctangent detector as many times as point number for a current value of the demodulated signal, and outputs a resultant signal;
a subtractor that detects a noise intensity of the demodulated signal generated by the arctangent detector by calculating a difference between an input value and an output value of the median filter;
a determining circuit that determines whether the noise intensity of the demodulated signal detected by the subtractor exceeds a threshold value; and
a selector that selects the output value from the median filter as an output signal when the noise intensity of the demodulated signal detected by the subtractor exceeds the threshold value and that selects the input value input to the median filter as an output signal when the noise intensity of the demodulated signal detected by the subtractor does not exceed the threshold value.

16. The FM receiver according to claim 15, further comprising a filter that removes an unnecessary high-frequency component from an output of the second mixer.

17. The FM receiver according to claim 16, wherein the first mixer, the intermediate frequency amplifier, the second mixer, the filter, the arctangent detector, the median filter, the subtractor, the determining circuit, and the selector are formed on a single integrated circuit (IC) chip.

18. The FM receiver according to claim 17, further comprising:
a receiving antenna that receives a radio wave transmitted in space; and
a radio frequency amplifier that amplifies the FM received signal received by the receiving antenna.

19. The FM receiver according to claim 18, wherein the radio frequency amplifier is modularized separately of the IC chip.

20. The FM receiver according to claim 15, further comprising a point number altering unit that increases the point number in the median filter when the noise intensity of the demodulated signal detected by the subtractor exceeds the threshold value and that decreases the point number in the median filter when the noise intensity of the demodulated signal detected by the subtractor does not exceed the threshold value.

* * * * *